Aug. 30, 1966     S. LIGHTER     3,269,484
ACOUSTIC ABSORBING STRUCTURE
Original Filed March 7, 1962     6 Sheets-Sheet 1
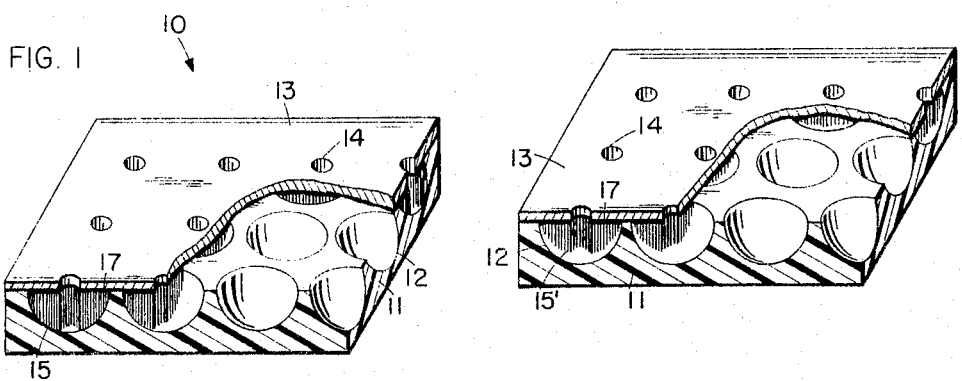
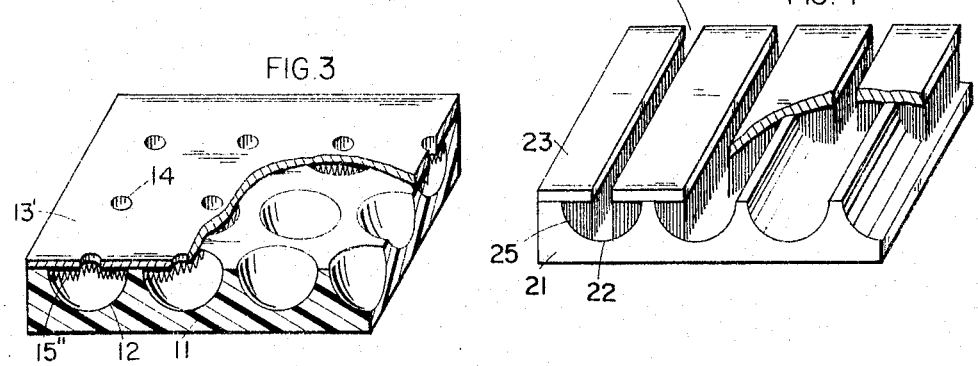
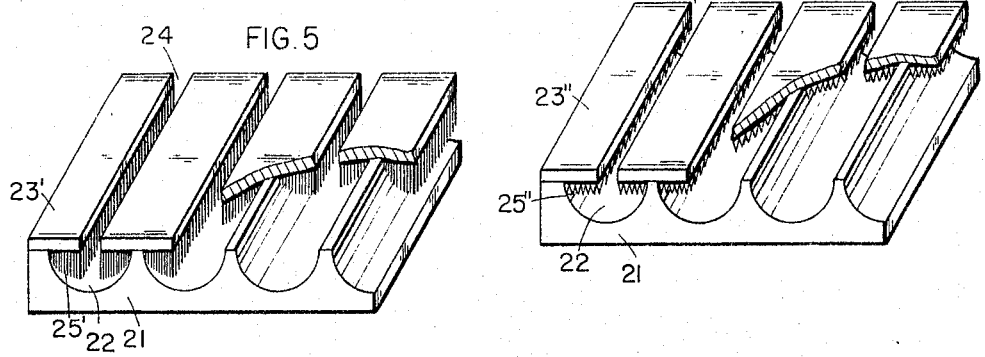
INVENTOR.
STEPHEN LIGHTER
BY
ATTORNEY Aug. 30, 1966     S. LIGHTER     3,269,484

ACOUSTIC ABSORBING STRUCTURE

Original Filed March 7, 1962     6 Sheets-Sheet 2

INVENTOR.
STEPHEN LIGHTER

BY

ATTORNEY

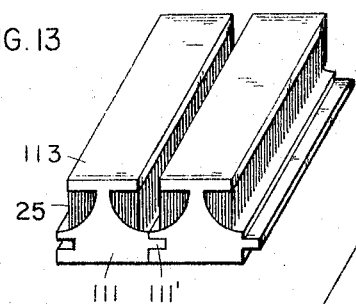
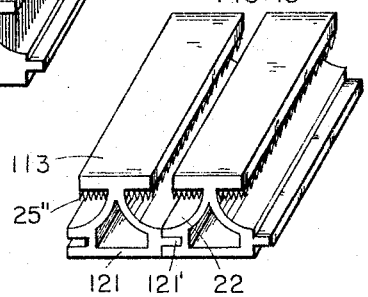
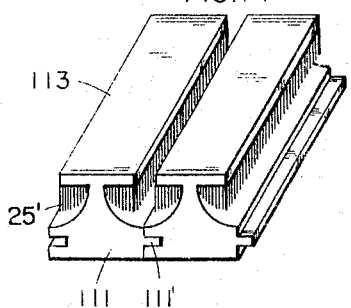
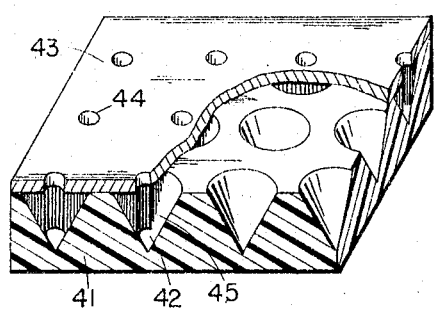
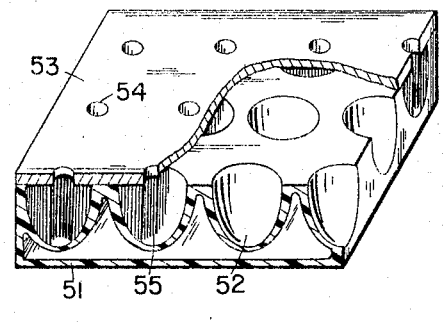
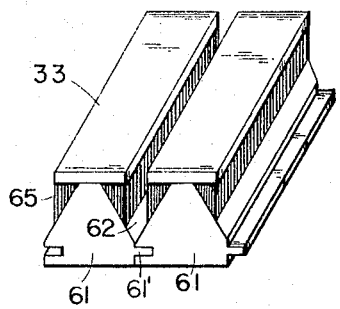
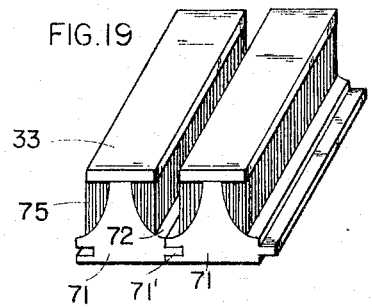

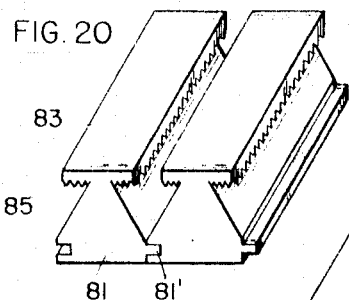
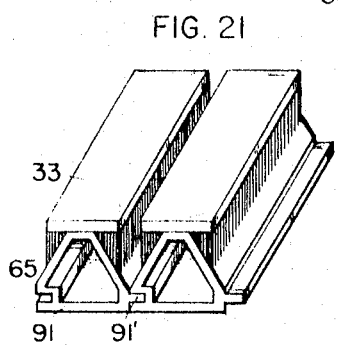
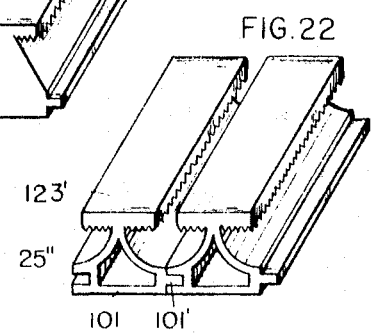
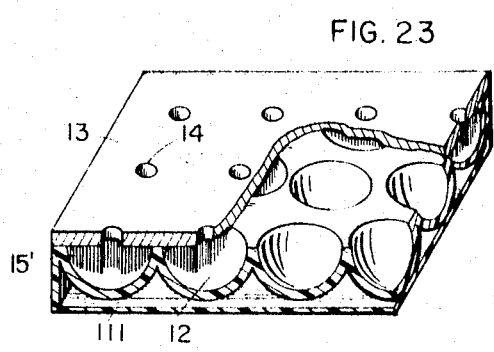
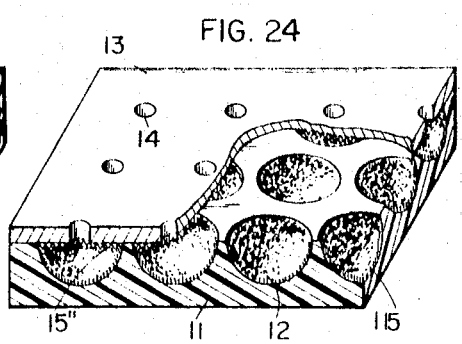
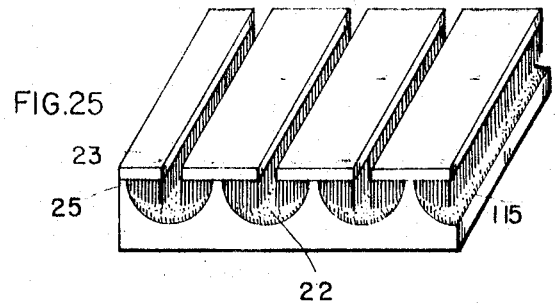
INVENTOR.
STEPHEN LIGHTER
BY
ATTORNEY

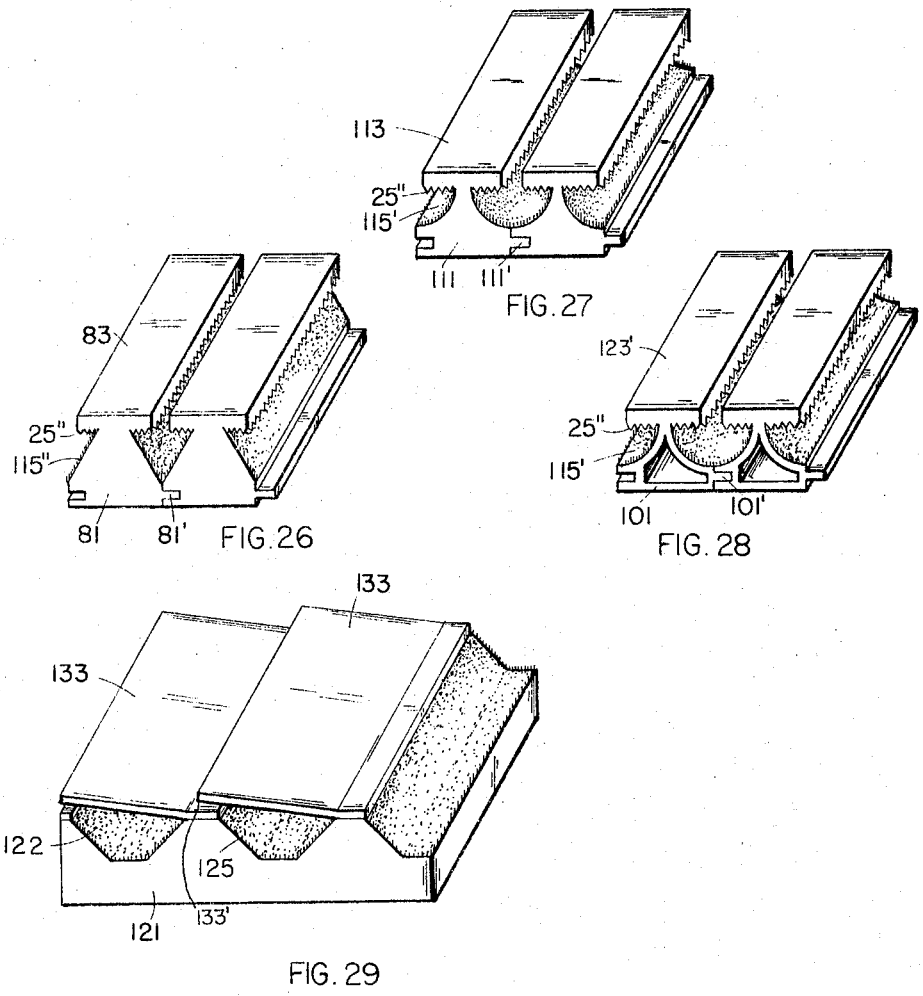

Aug. 30, 1966  S. LIGHTER  3,269,484
ACOUSTIC ABSORBING STRUCTURE
Original Filed March 7, 1962  6 Sheets-Sheet 6

INVENTOR.
STEPHEN LIGHTER
BY
ATTORNEY

United States Patent Office 3,269,484
Patented August 30, 1966

3,269,484
ACOUSTIC ABSORBING STRUCTURE
Stephen Lighter, 3522 Lake Mendota Drive,
Madison, Wis.
Continuation of application Ser. No. 178,090, Mar. 7,
1962. This application Sept. 24, 1963, Ser. No. 311,253
14 Claims. (Cl. 181—33)

This application is a continuation of application Serial No. 178,090, filed March 7, 1962, now abandoned, having the same title.

This invention relates to acoustic absorbing structures, and more particularly relates to panel structures which are provided with regularly shaped and regularly spaced cavities which open to one face of the panel and in which cilia-like fibers, pile or nap are disposed.

In auditoriums, theaters, and other enclosed spaces in which the ratio of volume to wall area is great, it is desirable to provide acoustic absorbing walls and ceilings for reducing environmental noise to a relatively low level within the space. Many acoustic absorbing structures have been proposed heretofore which incorporate concavities or depressions which extend into the interior of the material from the surface upon which sound waves impinge. Most such concavities or depressions are shaped as craters, fissures, or the like, and many, if not most, have been irregularly shaped and irregularly spaced.

In accordance with the hereinafter disclosed invention, panel structures are disclosed from which sound absorbing walls and ceilings can be constructed.

It is another object of my invention to provide an acoustic panel which may be manufactured and installed at low cost and which is highly efficient.

It is another object to provide an acoustic panel which comprises regularly shaped and regularly spaced cavities in one face thereof, and in preferred embodiments of which, cilia-like fibers are disposed.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a cross-sectional partially cut-away perspective view of a portion of one embodiment of the invention;

FIGURE 2 is a cross-sectional partially cut-away perspective view of a portion of another embodiment of the invention;

FIGURE 3 is a cross-sectional partially cut-away perspective view of a portion of another embodiment of the invention;

FIGURE 4 is a partially cut-away perspective view of a portion of another embodiment of the invention;

FIGURE 5 is a partially cut-away perspective view of a portion of another embodiment of the invention;

FIGURE 6 is a partially cut-away perspective view of a portion of another embodiment of the invention;

FIGURE 13 is a perspective view of a portion of another embodiment of the invention;

FIGURE 14 is a perspective view of a portion of another embodiment of the invention;

FIGURE 15 is a perspective view of a portion of another embodiment of the invention;

FIGURE 16 is a cross-sectional partially cut-away perspective view of a portion of another embodiment of the invention;

FIGURE 17 is a cross-sectional perspective view of a portion of another embodiment of the invention;

FIGURE 18 is a perspective view of a portion of another embodiment of the invention;

FIGURE 19 is a perspective view of a portion of another embodiment of the invention;

FIGURE 20 is a perspective view of a portion of another embodiment of the invention;

FIGURE 21 is a perspective view of a portion of another embodiment of the invention;

FIGURE 22 is a perspective view of a portion of another embodiment of the invention;

FIGURE 23 is a cross-sectional partially cut-away perspective view of a portion of another embodiment of the invention;

FIGURE 24 is a cross-sectional partially cut-away perspective view of a portion of another embodiment of the invention;

FIGURE 25 is a perspective view of a portion of another embodiment of the invention;

FIGURE 26 is a perspective view of a portion of another embodiment of the invention;

FIGURE 27 is a perspective view of a portion of another embodiment of the invention;

FIGURE 28 is a perspective view of a portion of another embodiment of the invention;

FIGURE 29 is a perspective view of a portion of another embodiment of the invention;

Figure 10:
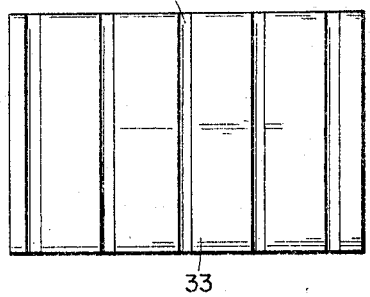
FIGURE 10 is a top plan view of the embodiments of FIGURES 4–9, 13–15, 18–22 and 25–28.

Referring now to FIGURE 1, there is shown a portion of a panel 10 of this invention comprising a lower or base sheet 11 with cavities 12 therein. Cavities 12 may be spherical or may be spheroidal but are preferably hemispherical or hemispheroidal and are shown as having a configuration of less than half of a sphere. Thus it may be seen that such cavities substantially are configured with a surface generated by revolution of a conic section about its axis, that is, they have a shape which may be described as being formed by rotary movement about its axis of a regular geometric member which is a conic section. Thus, each of the cavities comprises surfaces which converge as a function of the distance of the surfaces from said facing panel. It is apparent from the figure that the cavities do not communicate. They may also have other shapes as described hereinafter. Attached to the surface of sheet 11 in which cavities 12 are provided there is provided face sheet 13 having apertures 14 in the surface thereof. Each of apertures 14 is located substantially at the middle of one of cavities 12. A plurality of hair-like fibers 15 may be provided extending from the lower surface of sheet 13 to the surface of each of cavities 12. Fibers may be adherently attached at each end respectively to sheet 13 and sheet 11 or may be attached only to sheet 13 or only to sheet 11. They are preferably attached by means of a suitable adhesive such as by adhesive 17 as shown.

Each of sheets 11 and 13 may suitably be made from wood strips, plywood, sheet metal, asbestos, board such as Transite (registered trademark), cellulosic board such as Celotex (registered trademark) or the like.

Fibers 15 may be of glass, animal hair, hemp, sisal, jute, cotton synthetic resin or other suitable material. Sheet 11 is adhered to sheet 13 with adhesive 17 and fibers 15 are held in place by adhesive 17 as well. Any suitable adhesive such as starch paste or hoof glue may be utilized if the panel is to be used indoors. Any of the many adhesives having a synthetic resin base may be used in place of such hoof glue or starch based adhesives if desired, and are preferably used if the panel is to be utilized outdoors.

Cavities 12 may have a width of from about 4 inches to ⅛ inch and a depth of from about 3 inches to 1/16 inch and the distance between edges of adjacent cavities may be as much as 1 inch, but generally it is preferred that the cavities have a width of from about ⅜ inch to 2 inches, a depth of from ⅛ inch to 1¼ inches, and a spacing between the nearest adjacent portions of their perimeters at the upper surface of sheet 11 of no more than 1/16 inch. Apertures 14 may have a width of from about 1/16 inch to 1 inch, but perferably have a width of from between ⅛ inch and ½ inch. Base sheet 11 may have any suitable thickness sufficient to contain cavities 12, and face sheet 13 may have a thickness from about .002 inch to ½ inch but is preferably from .025 inch to .300 inch.

The embodiment of FIGURE 2 is similar to that of FIGURE 1. Most of its parts are identical to those of FIGURE 1 and are identically numbered but fibers 15′ are shown to be shorter than fibers 15. They extend inwardly from the lower or rear surface of face sheet 13 in a direction generally perpendicular thereto, but do not reach the surface of cavities 12. They are able therefore to wave like cilia in response to sound waves in cavities 12 and may thus absorb energy more effectively than can fibers 15.

In FIGURE 3 the article shown is similar to that shown in FIGURE 1 wherein base sheet 11 is identical thereto and face sheet 13′ differs therefrom by embodying dentate members 15″ on the underside of face sheet 13′ inwardly extending into each of cavities 12. For example, in a face sheet of aluminum composition, dentate projections 15″ may be provided by removing portions from the lower surface of sheet 13′ with engraver's tools or other metal cutting tools. If sheet 13′ is of wood, dentate projections 15″ may consist of shavings produced by cutting or chiseling sliver-like projections on the lower surface of the sheet. The effect of the roughened surface on sheet 13′ is to absorb acoustic energy and attenuate the sound intensity.

The embodiment of FIGURE 4 corresponds to that of FIGURE 1, except that each of cavities 22 in base 21 is long and channel-like, and apertures 24 in face sheet 23 are elongated and located substantially over the center of concavities 22 and extend the length of the concavities. Thus it may be seen that the concavities may be described as having a shape which might be produced by linear translatory movement (parallel to the surface of the facing panel) of a regular geometric member which is a conic section. Thus, each of the cavities comprises surfaces which converge as a function of the distance of the surfaces from said facing panel. It is apparent from the figure that the cavities do not communicate. Fibers 25 are similar to fibers 15 of FIGURE 1 with the upper fiber ends being cemented to the concealed surface of face sheet 23′. The fibers extend the length of concavities 22.

The embodiment of FIGURE 5 corresponds to that of FIGURE 2 with the exception that concavities 22 and apertures 24 are elongated. Fibers 25′, like fibers 15′ of the embodiment of FIGURE 2, extend short of contact with the surface of concavities 22.

The embodiment of FIGURE 6 corresponds to that of FIGURE 3 with the exception that elongated concavities 22 and apertures 24 are provided with projections 25″ extending inwardly from sheet 23″ in similar manner to projections 15″ of FIGURE 3. Projections 25″ may be either integrally provided on sheet 23″ or may comprise a separate material adhered thereto.

Figure 7:
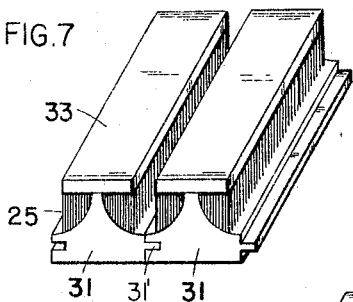
FIGURE 7 is a perspective view of a portion of another embodiment of the invention.

In FIGURE 7 is shown another embodiment of the invention similar to the embodiment of FIGURE 4, but comprising discrete modular units joined by tongue and groove joints 31′ instead of larger panel sections as shown in FIGURE 4. Each base section 31 is provided with a tongue on one side thereof and a groove on the other side thereof so that a plurality of such sections may be joined together in operable manner to provide a unitary structure similar to that shown in FIGURE 4. Panel sections 33 are adhesively or otherwise adhered to base sections 31, and fibers 25 are adhered to either the concealed surface of panels 33 or with base sections 31 with which they extend into contact as shown. Ceilings or walls made of such units can be readily fabricated at the building site with minimum waste. When base sections 31 are made of wood or foamed polystyrene or similar material which can be nailed, it is possible to fasten sections 31 to a substructure such as wall studding or ceiling joists by edge nailing the sections 31 in a manner which is conventional for hidden nailing of flooring strips. A nail is driven near the base of the tongue portion of section 31 at an angle so that the nail emerges from the under side of the base of section 31. Sections 31 may comprise wood, resin, fibrous board composition, foamed resin such as polystyrene, or other operable material as may be desired. Panel sections 33 may be of similar composition. Fibers 15 may comprise hair, synthetic resin, natural or mineral composition as may be desired. It is preferred that fibers 25 are of sufficiently small diameter to be freely moved by acoustic vibrations and thereby absorb acoustic energy. Fibers 25 may be adhered by suitable adhesive to the surface of either panel section 33 or base section 31.

Figure 8:
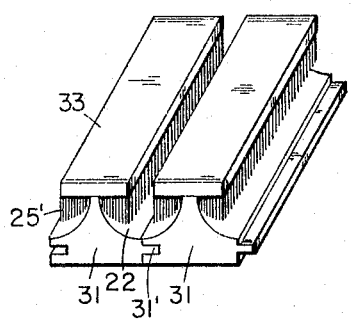
FIGURE 8 is a perspective view of a portion of another embodiment of the invention.

In FIGURE 8 is shown another embodiment of the invention similar to that shown in FIGURE 5 with the exception that modular units are provided contiguously joined by tongue and groove joints 31′. Panel sections 33 are adhesively attached to base sections 31 to provide an integral modular unit. Fibers 25′ extend into cavities 22 but do not touch the surface of the cavities so that they are freely movable by pressure waves which accompany acoustic vibrations, but are sufficiently extended to attenuate acoustic energy which reverberates within cavities 22.

Figure 9:
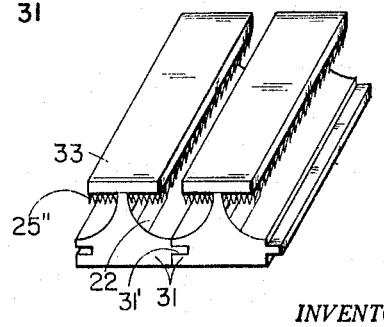
FIGURE 9 is a perspective view of a portion of another embodiment of the invention.

In FIGURE 9 is shown another embodiment of the invention similar to that shown in FIGURE 6, but with the exception that modular units comprising base sections 31 and tongue and groove joints 31′ are provided. Panel sections 33 are provided with dentate projections 25″ extending into cavities 22 in identical manner to that shown in FIGURE 6. Projections 25″ are integral with or affixed to the surface of panels 33 and absorb acoustic energy which is reflected within the cavities.

Figure 11:
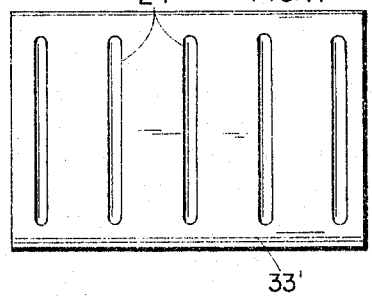
FIGURE 11 is a top plan view of an alternative modification of the plan view of FIGURE 10.
Figure 12:
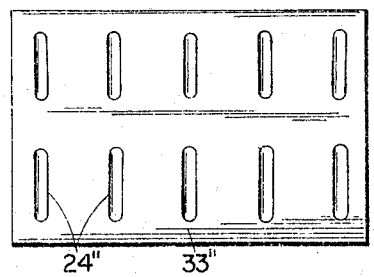
FIGURE 12 is another alternative top plan view of the plan view of FIGURE 10.

In FIGURE 10 panel sections 33 (which may correspond to or be replaced with members 23, 23′, 23″, 113, 83 or 123′) are shown extending longitudinally and separated by openings or apertures 24 which open into cavities 22 therebelow. Panel sections 33′ or 33″ comprising modifications of panel sections 33 may also be configured with a plurality of parallel slots 24′ and 24″ as shown in FIGURES 11 and 12, respectively. The slots do not extend continuously along the length of the article but extend discrete distances along a portion of the length of the article to form a repetitive pattern of slots on a wall or ceiling surface. Openings of other regular or variegated configurations or sizes may be provided in similar panel sections as desired.

In FIGURE 13 is shown another embodiment of the invention similar to the embodiment shown in FIGURE 7, but comprising integral panel portion 113 and base portion 111; fibers 25 are adhered to either the concealed surface of portion 113 of the article or to base portion 111 in a similar manner to that shown in FIGURE 7. Tongue and groove joints 111' are provided between adjacent portions 111 to provide an article which is like the article of FIGURE 7 in all respects, but which is unitarily manufactured by extrusion of metal or synthetic resin or by molding, or other forming process as desired.

In FIGURE 14 is shown an embodiment of the invention which is similar to that shown in FIGURE 8 except that panel portion 113 and base portion 11 are integrally formed by extrusion or molding. Fibers 25' are adhesively attached to the surface of panel portion 113 in a suitable manner as above described.

In FIGURE 15 is shown an embodiment of the invention which is similar to the embodiment shown in FIGURE 9 with the exception that panel portion 113 and base portion 121 are integrally formed as a hollow extrusion or molding. Projections 25" are provided within concavities 22 to diffuse and dissipate sound waves and absorb acoustic energy. Dentate projections 25" may comprise separately formed material of similar or dissimilar composition such as wood, metal, synthetic resin or other material as desired, which may be adhered in place.

The articles of all of the embodiments illustrated heretofore are provided with a plurality of semi-cylindrical cavities or semi-spherical cavities. In the embodiments hereafter described, articles having cavities of other shapes are disclosed.

In FIGURE 16 is shown another embodiment of this invention comprising facing panel 43 and base panel 41. Base panel 41 is provided with a plurality of conical cavities 42 in which fibers 45 are provided in annular arrangement around apertures 44 in panel 43. Thus it may be seen that the cavities may be described as having a shape which may be produced by revolution about its axis of a regular geometric member which is a conic section. Thus, each of the cavities comprises surfaces which converge as a function of the distance of the surfaces from said facing panel. It is apparent from the figure that the cavities do not communicate. Fibers extend from the surface of panel 43 to the surface of the conical cavities, but are adhered only to one of the surfaces. The article is similar in all respects to the embodiment of the invention shown in FIGURE 1 except that conical cavities rather than hemispheroidal cavities are shown.

In FIGURE 17 is shown another embodiment of the invention comprising facing panel 53 adhered to base structure 51. Apertures 54 are provided in panel 53 and paraboloid cavities 52 are provided in base member 51 in regularly spaced geometric arrangement. Thus it may be seen that the cavities may be described as having a shape corresponding to that which may be produced by revolution about its axis of a regular geometric member which is a conic section. Thus, each of the cavities comprises surfaces which converge as a function of the distance of the surfaces from said facing panel. It is apparent from the figure that the cavities do not communicate. It may be observed that structure 51 has hollow interior portions. Fibers 55 are adhered to either the surface of base structure 51 or to the surface of panel 53 and extend into cavities 52 into substantial contact with the surface thereof. The panel functions in a manner similar to that of the article of FIGURE 1.

In FIGURE 18 is shown another embodiment of the invention similar to the article shown in FIGURE 4 and comprising cavities 62 of triangular cross-section, however, rather than cavities of semi-circular cross-section as shown in FIGURE 4. Thus it may be seen that the cavities may be described as having a shape which may be produced by linear translatory movement of a regular geometric member which is a conic section, the linear movement being parallel to the surface of panel sections 33. Thus, each of the cavities comprises surfaces which converge as a function of the distance of the surfaces from said facing panel. It is apparent from the figure that the cavities do not communicate. Panel sections 33 are affixed by adhesive or other means to base sections 61. Base sections 61 are fitted together in operable manner by means of tongue and groove joints 61'. Hairlike fibers 65 are adhered to the surface of either panel sections 33 or base sections 61 and extend into substantial contact with the other of said surfaces thereby to increase the sound absorbing properties of the cavities.

In FIGURE 19 is shown another embodiment of this invention similar to the embodiment shown in FIGURES 7 and 18, but provided with paraboloid cavities 72 as shown. Thus it may be seen that the cavities have a shape which may be described as a shape which may be produced by a linear translatory movement of a regular geometric member which is a conic section, the linear movement being parallel to the surface of panel sections 33. Thus, each of the cavities comprises surfaces which converge as a function of the distance of the surfaces from said facing panel. It is apparent from the figure that the cavities do not communicate. Panel sections 33 are adhered to base sections 71, and tongue and groove joints 71' are provided between adjacent base sections 71. Fibers 75 are secured to one of panel sections 33 and base portion 71 to absorb acoustic energy by moving in response to air pressure differentials. The article of FIGURE 19 is identical to that of FIGURE 4 except that cavities of parabolic cross-section are provided instead of cavities of semi-circular cross-section as shown in FIGURE 4 and except that the backing panel is provided by a plurality of base sections 71 instead of being a unitary or integral panel.

In FIGURE 20 is shown another embodiment of the embodiment of the invention similar to the embodiment shown in FIGURE 6, with the exception, however, that it comprises integrally formed panel portion 83 and base portion 81 with projections 85 provided on the under surface of panel portion 83 and with the additional exception that the cavities have a triangular cross-section rather than having a cross-section corresponding to a portion of a circle. If the article is molded, projections 85 which comprise a roughened integral surface may be provided by providing a roughened surface in the mold. Projections 85 may be formed in extruded articles by subsequent die pressing or sand blasting. Tongue and groove joint 81' is provided between adjacent sections of the acoustic panel to provide a flush, closely fitted structure.

In FIGURE 21 is shown another embodiment of the invention, similar to the embodiment in FIGURE 18, wherein hollow core sections 91 are provided. Tongue and groove joint 91' is provided between adjacent sections 91. Panel sections 33 are shown attached by brazing, soldering, adhesive or other means to base sections 91; however base sections 91 and panel sections 33 may comprise a unitary structure by being provided as a molding, extrusion or the like. However, panel sections 33 may comprise wood, fiber board, or other like material while base portions 91 may comprise metal, such as aluminum, synthetic resin or other operable material. Fibers 65 are affixed to surfaces of panel section 33 and section 91 in a manner similar to that shown in the embodiment of FIGURE 18. The article functions in a manner similar to that of the article shown in FIGURE 18.

In FIGURE 22 is shown another embodiment of the invention similar to the embodiment shown in FIGURE 15 comprising hollow base portions 101' formed by extruding metal or synthetic resin and panel portions 123 integral therein with roughened undersurface made by sand blasting, die pressing or otherwise working the surface to roughen it in the manner discussed above in connection with FIGURE 20. Tongue and groove joints 101' are provided between adjacent sections of the acoustic panel.

In FIGURE 23 is shown another embodiment of the invention similar to the embodiment shown in FIGURE 2 with the exception that base member 111 is of hollow construction made by casting or molding resin or metal or other material into the form shown. A sand mold may be used with the sand being removed from the interstices subsequent to casting of member 111. Fibers 15″ extend into cavities 12 in the manner described relative to FIGURE 2 and sheet 13 is provided with apertures 14 in similar manner also. The embodiment shown in FIGURE 23 functions in a manner identical to the embodiment shown in FIGURE 2.

In FIGURE 24 is shown another embodiment of the invention similar to the embodiment as shown in FIGURE 3, and comprising in addition pile lining 115 in cavities 12. Cavities 12 are provided in base member 11 with facing panel 13 adhered thereto. Apertures 14 in panel 13 open into cavities 12 and acoustic energy after passing through apertures 14 into cavities 12 is absorbed by pile lining 115 and projections 15″. Projections 15″ are provided on the undersurface of panel 13 in the manner described for the embodiment of FIGURE 3. Pile lining 115 may comprise either synthetic resinous material or natural material such as hair or the like. It may also be a mineral material such as glass fiber or asbestos fiber as desired.

In FIGURE 25 is shown another embodiment of the invention similar to the embodiment shown in FIGURE 5, but comprising in addition pile lining 115 in cavities 22 to provide a greater energy absorption for acoustic energy within cavities 22. Fibers 25 are provided on the undersurface of panels 23 and lining 115 is provided on the surfaces of the cavities 22 thereby providing a fully lined cavity for maximum absorption of acoustic energy in cavity 22.

In FIGURES 26, 27 and 28 embodiments similar to the embodiments shown in FIGURES 20 (partly and partly 20 or 22) and 22 respectively, are shown with the addition of pile lining in the cavities of the various embodiments of the invention. Thus, in FIGURE 26, adjacent sections 81 are joined by joints 81′ with panel portions 83 thereof comprising projections 25″ on the undersurfaces thereof. Pile lining 115 is provided on the surfaces of the cavities to provide maximum attenuation of acoustic energy within the cavities.

In FIGURE 27 base portions 111 of adjacent modular units are shown operably joined by tongue and groove joints 111′ with panel portions 113 being integral with base portions 111. Projections 25″ are provided on the undersurfaces of panel portions 113. Pile lining 115 is provided on the surfaces of the semi-cylindrical cavities to provide a lined acoustic chamber with projections being provided as shown.

In FIGURE 28 is shown an embodiment of the invention which is identical to the embodiment shown in FIGURE 22, with the addition of pile lining 115 on the surfaces of the cavities in between adjacent base portions 101 of the modular units shown. The advantage of providing pile lining 115 in the cavities of the embodiments of this invention is to absorb sound energy and acoustic energy more efficiently and to prevent resonance from occurring in the structure at a particular acoustic frequency.

In FIGURE 29 is shown another embodiment of the invention comprising panels 133 adhesively affixed to base member 121. Cavities 122 are provided in base member 121 with panels 133 extending over cavities 122. Base member 121 is preferably made from fibrous material such as natural fibers cemented together with gypsum or the like. Panels 133 preferably comprise sheet material such as aluminum or other operable metal or from synthetic resin. Acoustic energy enters cavities 122 through the slits 133′ between adjacent panels 133 and reverberates therein until absorbed by the relatively soft composition of which base member 121 is preferably comprised, such as synthetic resin or other operable material. Cavities 122 may be lined with pile or fleece-like material 125 as shown.

Figure 30:
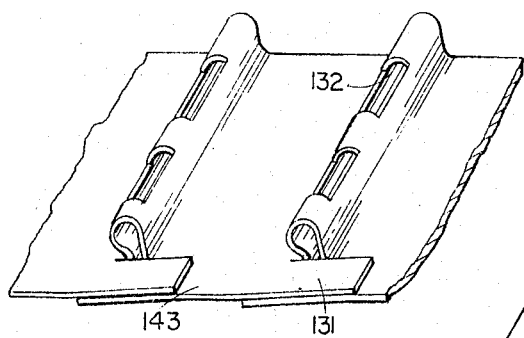
FIGURE 30 is a fragmentary perspective view of a portion of another embodiment of the invention.
Figure 32:
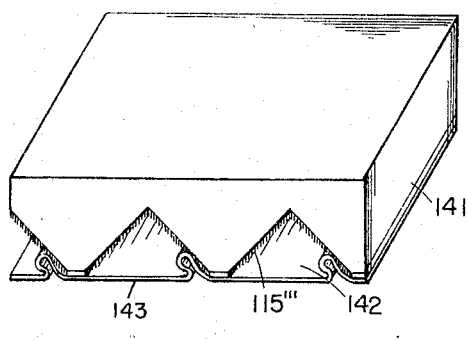
FIGURE 32 is a cross-sectional perspective view of a modification of the portion of FIGURE 31.
Figure 31:
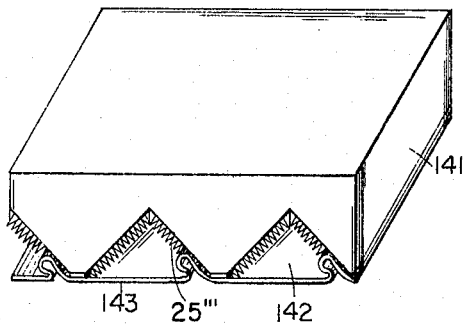
FIGURE 31 is a perspective view of a portion of another embodiment of the invention incorporating the device of FIGURE 30.

In FIGURE 30 is shown panel 143 which may be applied as shown in FIGURES 31 and 32 or which in similar manner may be turned upside down and substituted for panels 133 of FIGURE 29. Panel 143 after being turned upside down, may be attached in the same manner as it is attached to base member 141 in FIGURE 31, to base member 121 (FIGURE 29) with projecting edges 131 overlapping adjacent portions to provide an operable covering structure. Panel 143 is preferably made of sheet metal, with openings 132 being provided therein by die stamping operations or the like. The stamped panel blank is formed into the configuration shown by bending the blank in operable manner so that sound waves may pass into the structure through openings 130 and be trapped in a cavity beneath the panel as shown in FIGURE 31. Projecting edges 131 overlap adjacent portions and serve to align the edges of the plurality of portions in operable manner.

In FIGURE 31 is shown an acoustic panel comprising panel 143 of FIGURE 30 affixed to base member 141. Base member 141 is provided with grooved cavities 142 over which panel 143 is affixed. Acoustic energy enters into cavities 142 through openings 132 (FIGURE 30) in panel 143 and is reflected therein until absorbed, or at least substantially attenuated, by reverberation and absorption by dentate projections 25‴.

In FIGURE 32 is shown another embodiment of the invention which is similar to the article shown in FIGURE 32, but comprises as well pile lining 115‴. Lining 115‴ in cavity 142 increases the sound absorbency of the cavity. The material from which base member 141 is constructed is preferably foamed polystyrene or other foamed resinous material, or may be foamed metal fiber composition board, etc. Lining 115‴ may be natural or synthetic fiber material such as rayon, Dacron, or nylon pile or the like.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. An acoustic absorbing structure comprising in combination a backing panel and a facing panel, said backing panel having a plurality of cavities extending thereinto from one surface thereof, said cavities having a shape corresponding to that generated by movement of a regular geometric member which is a conic section, said movement selected from revolution of the section about its axis and linear translatory movement parallel to said surface, said facing panel abutting said surface of said backing panel and being provided with an apertured disposed centrally over each of said cavities in said backing panel, said aperture being of lesser cross-sectional maximum dimension than the maximum parallel adjacent cross-sectional dimension of said cavity, each of said cavities comprising surfaces which converge as a function of the distance of said surfaces from said facing panel, at least one of the surfaces of said cavity and the abutting side of said facing panel being provided with a plurality of projections to provide at the surface to which said projections are affixed means for diffusing and absorbing acoustic energy within said cavity.

2. The article of claim 1 wherein said cavities substantially are configured with a surface generated by revolution of a conic section.

3. The article of claim 1 wherein said cavities are elongated and are of substantially uniform width.

4. The article of claim 1 wherein said projections are fibers.

5. The article of claim 1 wherein said projections are dentate.

6. The article of claim 1 wherein said backing panel comprises a plurality of identical adjoined longitudinally extended units, each of said units defining a portion of one cavity and defining a portion of a next adjacent cavity.

7. The article of claim 6 wherein said projections are fibers.

8. The article of claim 6 wherein said projections are dentate.

9. The article of claim 3 wherein said facing panel comprises a plurality of strips wherein each strip is attached at one of its edges to said backing panel adjacent one edge of a cavity and extends angularly over said cavity to define a slit adjacent the opposite edge of said cavity.

10. The article of claim 9 wherein said projections are fibers.

11. The article of claim 1 wherein said projections are dentate.

12. The article of claim 3 wherein said facing panel is a sheet of stamped-out sheet metal folded to provide a fold adjoining each cavity, each fold providing apertures communicating the cavity with the atmosphere.

13. The article of claim 12 wherein said projections are fibers.

14. The article of claim 12 wherein said projections are dentate.

References Cited by the Examiner

UNITED STATES PATENTS

| | | | |
|---|---|---|---|
| 1,730,529 | 10/1929 | Robbins | 181—33 |
| 1,738,654 | 12/1929 | James | 181—33 |
| 1,825,770 | 10/1931 | Barnett | 181—33 |
| 1,918,149 | 7/1933 | Sullivan | 181—33 |
| 2,007,139 | 7/1935 | Munroe et al. | 181—33 |
| 2,271,871 | 2/1942 | Newport et al. | 181—33 |
| 2,855,039 | 10/1958 | Gross | 181—33 |
| 2,926,742 | 3/1960 | Fischer | 181—33 |
| 2,994,400 | 8/1961 | Heller | 181—33 |
| 3,077,945 | 2/1963 | Thomas et al. | 181—33 |

FOREIGN PATENTS

| | | |
|---|---|---|
| 206,535 | 4/1956 | Australia. |
| 1,054,526 | 10/1953 | France. |
| 1,123,134 | 6/1956 | France. |
| 776,994 | 6/1957 | Great Britain. |
| 151,144 | 8/1955 | Sweden. |

RICHARD B. WILKINSON, *Primary Examiner.*

LEO SMILOW, LOUIS J. CAPOZI, *Examiners.*

R. S. WARD, *Assistant Examiner.*